United States Patent
Bourrel et al.

(10) Patent No.: US 7,510,606 B2
(45) Date of Patent: Mar. 31, 2009

(54) BITUMINOUS EMULSIONS, THEIR METHOD OF PREPARATION AND THEIR USE FOR THE PRODUCTION OF MATERIALS AND ROAD PAVEMENTS

(75) Inventors: Maurice Bourrel, Pau (FR); Eric Jorda, Lyons (FR); Didier Lauranson, Lons (FR); Francis Verzaro, Serris-Castet (FR)

(73) Assignee: CECA S.A., Puteaux (FR)

( * ) Notice: Subject to any disclaimer, the term of this patent is extended or adjusted under 35 U.S.C. 154(b) by 0 days.

(21) Appl. No.: 11/252,215

(22) Filed: Oct. 18, 2005

(65) Prior Publication Data

US 2006/0086288 A1 Apr. 27, 2006

(30) Foreign Application Priority Data

Oct. 19, 2004 (FR) .................................. 04 11077

(51) Int. Cl.
*C09D 195/00* (2006.01)
*C08L 95/00* (2006.01)

(52) U.S. Cl. ................... 106/277; 106/284.06

(58) Field of Classification Search ................. 106/277, 106/284.06

See application file for complete search history.

(56) References Cited

U.S. PATENT DOCUMENTS

| 4,832,747 A | * | 5/1989 | Marchal ................. 106/277 |
| 5,399,293 A | * | 3/1995 | Nunez et al. ............... 516/76 |
| 5,539,021 A | * | 7/1996 | Pate et al. ................. 523/335 |
| 5,622,920 A | * | 4/1997 | Rivas et al. ................ 507/232 |
| 5,851,430 A | * | 12/1998 | Chirinos et al. ............ 516/38 |
| 6,602,917 B1 | * | 8/2003 | Leal Calderon et al. ....... 516/43 |

FOREIGN PATENT DOCUMENTS

| EP | 0 283 246 A | | 9/1988 |
| EP | 001057873 A1 | * | 12/2000 |
| WO | WO 92/19683 A | | 11/1992 |
| WO | WO 94/23129 | * | 10/1994 |
| WO | WO 02/00795 A2 | * | 1/2002 |

* cited by examiner

*Primary Examiner*—David M Brunsman
(74) *Attorney, Agent, or Firm*—Millen, White, Zelano & Branigan, P.C.

(57) ABSTRACT

The present invention relates to bitumen emulsions that can be used in roadmaking applications for the production of cold mixes, emulsion-stabilized gravel and road pavements obtained at ambient temperature, the cohesion of which at young age is substantially improved over the cold mixes, emulsion-stabilized gravel and road pavements of the prior art.

These bituminous emulsions are characterized by a median diameter of 0.6 μm or less, and preferably 0.5 μm or less.

18 Claims, No Drawings

BITUMINOUS EMULSIONS, THEIR METHOD OF PREPARATION AND THEIR USE FOR THE PRODUCTION OF MATERIALS AND ROAD PAVEMENTS

The present invention relates to the manufacture of bituminous emulsions and road pavements obtained at room temperature (i.e. in general between 0° C. and +40° C.) from aggregates and from these emulsions.

Bituminous emulsions in most cases comprise a bituminous binder, a cationic surfactant the emulsions are then called cationic emulsions—or an anionic surfactant—the emulsions are then called anionic emulsions—and water. Cationic emulsions are generally preferred both for their speed of breaking on the aggregates and for their adhesion properties obtained between the aggregates and the broken emulsion, giving the road pavements that have just been produced good mechanical properties.

Bituminous materials obtained by coating or contacting aggregates with bituminous emulsions have been known for a long time. In particular, the profession makes a distinction between cold-poured bituminous mixes, open-graded, semi-dense, dense and storage-grade bituminous mixes, emulsion-stabilized gravel, surface coatings and bond coats.

In order to produce road pavements, one type of bituminous material comprises the open-graded, semi-dense and dense cold bituminous mixes, storage-grade cold bituminous mixes and emulsion-stabilized gravel. The optimized choice of bituminous emulsion (nature and amount of the emulsifier, bitumen concentration, pH) makes it possible to solve, in most cases, partially or completely, the problems of coating, of transportation and of application of the bituminous mix in its swollen form. However, once the mix has been spread in the form of a pavement, the compacting step takes place, the purpose of which is to ensure increased cohesion, that is to say good adhesion between bitumen and aggregates, so as to allow the pavement to support traffic, which has been temporarily interrupted during application in the case of roadway repair or renovation. This cohesion is obtained by compacting the bituminous mix accompanied by expulsion of the aqueous phase and of air. Cold bituminous mix materials have a high degree of friction, thereby impeding compaction: the levels of compactness obtained cold are very often less than the levels of compactness obtained from the same materials coated hot with the same binder. However, it is well known to those skilled in the art that the level of compactness and the degree of expulsion of water have an influence on the cohesion of the cold-compacted material. Thus it is found that, at the present time, success in producing roadways subjected to heavy traffic (T1 or higher) depends not only on the technique used but also on the meteorological conditions on the day the work is carried out, or even the day after. Strong sunlight, a high temperature or a sufficient wind contribute to drying of the pavement and to its increase in cohesion.

In all these cases of application of cold bituminous mixes considered here (storage-grade, open-grade, semi-dense and dense mixes and emulsion-stabilized gravel), rapidly opening or reopening the road to traffic poses more problems when the road traffic to which the roadway is subjected is heavy. In the case of opening a roadway prematurely, expulsion of aggregates occurs, thereby reducing the ability of the pavement to withstand wear and tear and degrading its surface quality. It is therefore important to obtain a high level of cohesion as rapidly as possible in order to avoid compromising on the final properties of the pavement by substantial degradation.

This rapid improvement in cohesion may be obtained in part by increasing the effectiveness of the compacting step by the addition of additives such as those disclosed in EP 1 057 873 and WO 02/00795, but this improvement is limited. It may also be provided by the addition of a large amount of cement, as disclosed in WO 02/066394, but the additional cost is then high and the emulsions must have a very high content of non-ionic surfactant, which consequently poses water repellency problems. Another solution consists in adding breaking agents at various moments during the process, as disclosed in WO 94/23129 and in the patents cited in the latter. These methods are generally expensive and require equipment modifications, or even new dedicated equipment.

In the light of the foregoing, it therefore appears that the behaviour of the cold mixes of the prior art suffers from lack of cohesion at a young age compared with techniques carried out hot. In practice, this means that the use of cold mixes is almost exclusively limited to roadways subject to moderate or light traffic.

SUMMARY OF THE INVENTION

The present invention provides bituminous emulsions, cold mixes and emulsion-stabilized gravel containing them, obtained by coating and laying with standard road equipment, the cohesion at young age (during the first 24 hours) of which is substantially improved (by a factor of two or more) compared with cold mixes and emulsion-stabilized gravel of the prior art. The present invention proves to be particularly advantageous for roadways subject to heavy traffic, insofar as it makes it possible to obtain road pavements whose cohesion is sufficient to stabilize the construction before it is reopened to traffic, but without it being necessary to wait several days.

The emulsions according to the invention are characterized by a median diameter (measured by laser particle size analysis) of 0.6 μm or less.

The term "median diameter" of the emulsion is understood to mean the diameter of the dispersed bitumen particles that exactly divides the recorded population into two halves of equal volume.

In the roadmaking industry, bituminous emulsions usually have a median diameter (measured by laser particle size analysis) of between 2 and 10 μm; bituminous emulsions of smaller size cannot be manufactured on an industrial scale using standard equipment, such as a colloid mill, even though it is possible, on a laboratory scale and using laboratory equipment, to prepare emulsions with a median diameter of less than 2 μm, typically about 1 μm, using particularly complex equipment and/or operating methods that cannot be transposed to an industrial process both for economic and technical reasons.

U.S. Pat. No. 4,832,747 proposes a solution based on static mixers for manufacturing emulsions with diameters from 2 to 8 μm that can in theory be extended to the 0.5 to 8 μm range, even though no example of a bituminous emulsion of less than 2.6 μm was provided in the above document. In principle, this solution seems to have the potential for industrial scale-up, although being particularly expensive.

EP 999 890 B1 mentions the possibility of manufacturing bitumen emulsions with a diameter of less than 2 μm by operating under conditions in which the dispersed phase is highly concentrated, but in no example is the median diameter of the bituminous emulsions less than 0.8 μm and the only surfactant used (TTAB) of the quaternary type does not destabilize in the presence of aggregates— there is therefore neither an increase in cohesion nor breaking of the emulsion during compaction, thereby precluding such a technical solution for road applications.

Patent U.S. Pat. No. 5,539,021 teaches how to make, in a continuous manner, polymer emulsions with a median diameter of around 0.5 µm—emulsification takes place in a concentrated phase and the diameter is regulated by varying the dispersing phase/dispersed phase ratio. The above patent does not suggest the use of this method with bitumen as dispersed phase.

The subject of the present invention is also a method for producing bitumen emulsions with a median diameter of 0.6 µm or less, preferably 0.5 µm or less, the mixing of which with the chosen aggregates results in cold mixes or emulsion-stabilized gravel having cohesion properties superior to those produced with conventional industrial-scale bituminous emulsions.

The method of preparing a bituminous emulsion according to the invention is characterized in that:
  a) a concentrated aqueous solution of surfactant(s) (comprising more than 30% by weight of surfactant), optionally containing at least one acid when a cationic surfactant is used or a base when an anionic surfactant is used;
  b) bitumen heated to a temperature of between 50 and 120° C. is progressively added at a controlled rate to the said concentrated surfactant solution maintained with stirring until the bitumen content of the emulsion at the end of this first emulsification phase is equal to 90% by weight or higher; and
  c) the bitumen content of the emulsion is then lowered down to a value of preferably between 60% and 80% by weight by dilution, while stirring, with water whose temperature is between 20 and 90° C. and preferably between 40 and 80° C.

After step c), the bitumen content of the emulsion corresponds to the content of the emulsion ready to be used for a road application for the production of cold mixes and/or emulsion-stabilized gravel and of materials obtained by the coating of or contacting with aggregates, recycling materials, mix aggregates (or a blend of these products) and of the said bituminous emulsion.

The stirring system in steps b) and c) may be a turbine stirrer, a scraping anchor stirrer, a propeller stirrer or preferably a whip stirrer, the stirring speed of which is greater than 50 rpm, or any other system equivalent in terms of mixing capability.

The surfactant concentration of the emulsions according to the invention is in general greater than 12 kg per tonne of emulsion.

Among surfactants or emulsifiers that can be used for manufacturing the cationic emulsions according to the invention, mention may be made of standard cationic surfactants and more particularly those that are liquid at ambient temperature (typically 0-40° C.).

For example, it is possible to use alkyl(ene)polyamines, alkyl(ene) quaternary ammonium salts, alkyl(ene)amidoamines and their alkyl(ene)imidazoline cyclization derivatives, with an alkyl chain containing between 8 and 22 carbon atoms, alkoxylated alkyl(ene) polyamines and more particularly propoxylated tallow dipropylenetriamine(N-tallow-1,1'-bis[[3-[(3-aminopropyl)amino]propyl]imino]amines, RN=97592-79-5), the latter being well represented in the industry by Polyram®SL sold by CECA S.A. It is also possible to use blends of cationic surfactants or cationic surfactants and nonionic cosurfactants, the limitation being due to the maximum acceptable concentration in solution in order to avoid gelling. It would not be outside the scope of the invention to employ any technique known to those skilled in the art for preventing gel formation in concentrated surfactant solutions, such as the use of cosolvents and/or hydrotropes.

It is preferred to add a certain amount of acid(s), generally chosen from HCl and $H_3PO_4$, to the aqueous cationic surfactant phases.

The bitumens or bituminous binders may be chosen from the bituminous binders usually employed in bituminous emulsions for emulsion-stabilized gravel and/or cold mixes for wearing courses. Their penetrability is in general between 70/100 and 500. Their chemical nature depends on the crude or crudes from which they are obtained. The distinction is made between paraffinic bitumens, preferred by the Applicant, and naphthenic crudes.

The emulsions may be prepared with one or more bituminous binders. In the latter case, the various binders may be mixed hot before emulsification, or two (or more) emulsions may be prepared, each containing at least one binder, which will then be mixed together to give what is called a hybrid emulsion, which will be brought into contact with the aggregates in order to produce the mix.

The cold mixes and emulsion-stabilized gravel according to the invention may be obtained by mixing aggregates moistened with addition water and with the bituminous emulsion defined above according to the techniques and by means of equipment known and normally employed in the roadmaking industry. The coating, emulsion-breaking, optional transportation, discharge and application steps are carried out according to the standard procedure of the roadmaking company and have the advantage of not requiring equipment modifications or setting modifications, while still exhibiting improved cohesion once all the steps preceding the opening to traffic have been carried out.

The invention also relates to the materials obtained by coating or contacting aggregates, recycling materials, mix aggregates (or blend of these products) with a bituminous emulsion according to the invention as defined above. The term "mix aggregates" is understood to mean materials resulting from the destruction of pavements made from mixes and the term "recycling materials" is understood to mean any type of material resulting from the recovery of industrial waste that can be recycled in the manufacture of road mixes (demolition materials, clinker, steelmaking slag, tyres, etc.)

EXAMPLES

Preparation of Concentrated Surfactant Solutions

A 500 ml beaker was placed in a water bath, the beaker being fitted both with a propeller stirrer, the speed of which may be up to 300 rpm, and with a temperature-compensated pH electrode.

The necessary amount of water (250 ml) for producing the desired concentrated surfactant solution was introduced into the beaker, the stirring was started and the water contained in the beaker was heated to T=60° C.

At the same time, the chosen surfactant was heated to T=60° C. on a regulated hotplate. When the water and the surfactant were at temperature (T=60° C.), the surfactant was added using a dropper until the pH was about 5-6. The medium was then acidified by adding 37% HCl (at room temperature) until a pH of between 1 and 2 was obtained and all the added surfactant had dissolved.

The addition of surfactant was continued until a pH of between about 5 and 6 was obtained and then the solution was again acidified until a pH of between 1 and 2 was obtained, and so on until the appearance of a little gel that does not dissolve in the solution (corresponding to a surfactant concentration of about 23% in the case of Polyram® SL). At this stage, the solution was acidified so as to obtain a pH of 0.6.

Next, the addition of surfactant was continued in an amount of about 1 g every 5 minutes, each time adding the necessary amount of acid to bring the pH to about 0.5-0.6.

Thus, a surfactant concentration of about 28% was obtained. (By weighing the beaker/stirrer assembly it was possible to monitor the surfactant concentration during production).

To go beyond a surfactant concentration of 28% (for example up to 31%, it was necessary to continue evaporating the water while making additions of acid when it was seen that a little gel started to form. Evaporation and acid addition were stopped when the correct surfactant concentration, verified by weighing, was obtained.

Preparation and Analysis of the Bituminous Emulsion 100 g of bitumen were heated on a regulated hotplate to a temperature of:
- 108° C. for a 70/100 penetration grade bitumen of 1.7 Pa·s viscosity, of the paraffinic type (from Total Feyzin); and
- 100° C. for a 190 penetration grade bitumen Nynas B 190, of 1.7 Pa·s viscosity, of the naphthenic type.

In parallel, 60 g of deionized $H_2O$ were heated to T=60° C., also on a regulated hotplate. Next, 7 g of the concentrated surfactant solution prepared using the operating method of the preceding paragraph were introduced at room temperature into a 600 cm$^3$ beaker (of tall shape: 12 cm in height and 8.5 cm in diameter) fitted with a stirring system.

The stirring system, which rested on the bottom of the beaker, was a metal kitchen whip 6 cm in diameter and 13 cm in height mounted on a stirrer shaft. The Leroy-Somer stirring motor had a power of 245 W and developed a torque of 0.8 N.m, the speed being preset to 600 rpm.

After the deionized water and the bitumen were at temperature, the preparation of the emulsion was started:
- by turning on the whip stirrer (V=600 rpm);
- then by progressively pouring the hot bitumen onto the concentrated emulsion for 1 min-1 min 15 s (it has been found that a shorter time is unsuitable—the emulsification is incomplete or gives rise to an inverse emulsion);
- when all the bitumen has been poured in, stirring was continued for 15 to 20 s before the deionized water was poured over about 5 s onto the concentrated bitumen emulsion; and
- the whip stirrer was left to rotate for about 1 min 30 s in order to homogenize the emulsion.

167 g of emulsion containing 60% bitumen were obtained, the particle size analysis of which was carried out using a Malvern Instruments Mastersizer S laser particle size analyser. The coefficients used for the calculation were 1.62; 0.0055 for the bitumen and 1.33 for the water.

Production of Cold Mixes and Measurement of their Cohesion

The cohesion of the mixes was measured using a ring shear test instrument, RST 01.PC model designed by Mr Dietmar Schulze (Germany) which imposes a deformation until breaking of a compacted mix placed in an annular cell surmounted by a cover connected to two force sensors. The annular cell was made up of two components: a lower part provided with fins, which contained the mix, and a cover also provided with fins.

The characteristics of the lower part of the annular cell used were the following: small diameter=100 mm; large diameter=200 mm; depth=40 mm; and twenty fins 44 mm in width and 5 mm in height screwed onto its bottom.

The characteristics of the cover of the annular cell used were the following: small diameter=105 mm; large diameter=195 mm; and twenty fins 44 mm in width and 5 mm in height that were screwed underneath.

$1^{st}$ step: Production of the mix and installation of the mix in the annular measurement cell of the ring shear test instrument.

About 1350 g of mix were produced in the following manner:
- 1200 g of aggregates of known particle size composition were placed in a stainless steel bowl;
- next, water was added in the required amount to the aggregates;
- the contents of the bowl were all mixed (for a few seconds) using a spatula in order to properly distribute the water among all the aggregates;
- the required amount of bitumen emulsion was added to the aggregates;
- mixing using a spatula was continued until the emulsion on the aggregates broke;
- the lower part of the annular cell of the measurement instrument was filled with the mix thus prepared and distributed as best as possible;
- then, after waiting for 45 minutes after the emulsion on the aggregate broke, the mix inside the measurement cell was compacted with a roll compactor of our design, described below, which produced a rearrangement within the mix so as to best simulate what occurs in the field during this phase.

$2^{nd}$ step: Compacting of the mix inside the measurement cell and application of the cover in order to make the impression of the fins in the mix, before it is dried and the cover removed for the drying.

The mix inside the measurement cell was compacted using a roll compactor of our design, formed by an arm able to rotate about its central axis using an electric motor. This arm was equipped with a stainless steel roll at each end and was provided with a support on which several masses each of 10 kg could be placed so as to be able to adapt the compacting to its specific requirements.

Characteristics of the Compactor

The width of each of the two rolls in contact with the mix was 45 mm; the support for the arm could take up to 70 kg of load; the electric motor rotating the arm of the compactor had a power of 1400 W and was equipped with both a variable frequency device and a speed reducer, which reduced the rotation speed of the motor by a factor of 5 (corresponding to a maximum rotation speed of 300 rpm).

To compact a mix, the procedure was as follows:
- the arm with its two rolls was placed on the mix;
- the support for the arm was loaded with the chosen mass of mix;
- the arm was rotated about its central axis at the desired speed, by varying the supply frequency for the electric drive motor.

The compacting conditions used for our trials were the following (the load was progressively increased, so as not to cause the two rolls to penetrate excessively into the mix before the arm started to rotate);
- 1 min with 0 kg of load on the arm support at V=1 km/h at the centre of the ring;
- 1 min with 10 kg of load on the arm support at V=1 km/h at the centre of the ring;

1 min with 20 kg of load on the arm support at V=1 km/h at the centre of the ring;
1 min with 30 kg of load on the arm support at V=1 km/h at the centre of the ring;
1 min with 40 kg of load on the arm support at V=1 km/h at the centre of the ring;
1 min with 50 kg of load on the arm support at V=1 km/h at the centre of the ring.

These compacting conditions resulted in levels of compactness between 76 and 81% depending on the compacted mixes (measured by height differences in the measurement cell).

When the mix was compacted, the lid of the measurement cell was placed on its surface and the fins pushed into the mix by 5 mm using a load rig of the Instron brand model 1186 (equipped with a 200 kN force sensor) in order to make the impression of the fins of the cover into the surface of the mix. As soon as the cover had been pushed in, it was removed in order to allow the mix to dry in the open air for the desired time.

3$^{rd}$ step: Measurement of the mix cohesion:
when the mix drying time had elapsed, the cover was put back on the surface of the mix, taking care to place the fins back in their impressions;
the annular cell surmounted by its cover was placed on the cohesion measurement instrument described above, fitted with two force sensors each of 50 kg;
the cover was connected to the two force sensors of the instrument;
the mix cohesion measurement was started by applying a pressure of 0.2 bar to the cover and imposing a circular deformation by rotating the annular cell at V=2°/min relative to the cover, which remained stationary between the two force sensors, so as to reach the point where the mix broke and to go a little beyond this;
at the same time, the instrument recorded the force resisting the deformation of the mix and the time, making it possible to obtain graphs of force=f(time) and to determine the force needed to break the mix. The value taken as cohesion value is the maximum force observed before break, from which the force generated by the friction of the aggregates was subtracted (which friction force became constant as a function of time after the mix broke).

The improvement in performance of the roadmaking products and emulsions according to the present invention was assessed by comparing it with that of roadmaking products and emulsions according to the prior art (prepared using a colloid mill), the median diameter of the emulsions being different.

The same cationic emulsifier was used in the various emulsion formulations tested, with a variable surfactant concentration depending on the emulsion formulation so as to vary the median diameter.

Example 1

Six emulsions of different median diameter, containing Polyram® SL (sold by CECA) as cationic surfactant and the same bitumen (70/100 penetration, sold by Total; 60% mass content) were prepared. Two emulsions (S1 and S2) were prepared using a conventional industrial method with a colloid mill (laboratory production set of the Emulbitume brand) and four emulsions were prepared using the method described in the "Preparation of the emulsion" paragraph above. Among the four emulsions produced using the method described in the "Preparation of the emulsion" paragraph, two emulsions (E5 and E6) were emulsions according to the invention, the other two (C3 and C4) were used for comparison, just like the two emulsions S1 and S2.

In the case of the emulsions prepared using the method described in the "Preparation of the emulsion" paragraph, the variation in particle size was obtained by modifying the surfactant concentration of the emulsion used.

In the case of S1 and S2, the particle size of the emulsion was varied by varying the rotation speed of the colloid mill.

The characteristics of these six emulsions are given in Table 1.

TABLE 1

| Emulsion | Surfactant content of the emulsion (kg/t) | Surfactant concentration of the surfactant solution (%) | Median diameter (μm) |
|---|---|---|---|
| S1 | 13 | 3.2 | 6.1 |
| S2 | 13 | 3.2 | 2.6 |
| C3 | 10.8 | 25.8 | 1.3 |
| C4 | 11.7 | 28 | 0.7 |
| E5 | 13 | 31 | 0.5 |
| E6 | 14.2 | 33.9 | 0.4 |

Using each of these emulsions, a cold mix was prepared according to the operating method described in the "Production of mixes and measurement of their cohesion" paragraph. The aggregates used were calcium silicate aggregates sold under the name "Neste", the particle size distribution of which was as follows:

| 0/2 mm | 40% |
|---|---|
| 2/4 mm | 12% |
| 4/6 mm | 48%. |

The content of filler (aggregate particles passing through an 80 μm screen) was around 8% by weight.

The content of addition water in the mix was 3 g per 100 g of aggregates.

The emulsion content within the mix was 9.5 g per 100 g of aggregates.

The cohesion of the mixes thus manufactured was tested according to the protocol described in the "Production of mixes and measurement of their cohesion" paragraph, the drying time being set at 19 h. The results of the cohesion measurements are given in Table 2.

TABLE 2

| Emulsion used in the mix | Median diameter (μm) | Cohesion (kg) |
|---|---|---|
| S1 | 6.1 | 25 |
| S2 | 2.6 | 25 |
| C3 | 1.3 | 26 |
| C4 | 0.7 | 28 |
| E5 | 0.5 | 45 |
| E6 | 0.4 | 55 |

Example 2

A 31 wt % surfactant solution containing a blend of 50% propoxylated tallow dipropylenetriamine (Polyrame® SL) and 50% tallow propylenediamine (sold by CECA S.A. under the Dinoram® S) was prepared using the method described in the "Preparation of concentrated surfactant solutions" paragraph. An emulsion according to the invention (E8) was produced from this concentrated surfactant solution using the method described in the "Preparation of the emulsion" paragraph. For comparison, an emulsion (S7) was produced with the same surfactant blend using a conventional industrial method with a colloid mill (laboratory production set of the Emulbitume brand).

A cold mix having a composition equivalent to that described in Example 1 was manufactured from each of these emulsions and cohesion-tested according to the operating method described in the "production of mixes and measurement of their cohesion" paragraph—the results are given in Table 3.

TABLE 3

| Emulsion | Emulsifier content in the emulsion (kg/t) | Median diameter (μm) | Cohesion (kg) |
|---|---|---|---|
| S7 | 13 | 3.5 | 27 |
| E8 | 13 | 0.5 | 55 |

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosure[s] of all applications, patents and publications, cited herein and of corresponding French application No. 04.11077, filed Oct. 17, 2004, is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A bituminous emulsion containing water, wherein the median diameter of dispersed bitumen particles is less than 0.5 μm and said median diameter being the diameter of the dispersed bitumen particles that exactly divides the recorded population into two halves of equal volume, said emulsion containing at least one acid and at least one cationic surfactant chosen from alkyl polyamines, alkenyl polyamines, alkoxylated alkyl polyamines, alkoxylated alkenyl polyamines, alkyl quaternary ammonium salts, alkenyl quaternary ammonium salts, alkylamidoamines, alkenylamidomines, and their alkyl imidazoline cyclization, and alkenyl imidazoline cyclization derivatives, the alkyl or alkenyl being a chain containing between 8 and 22 carbon atoms, the acid and cationic surfactant being present in sufficient amounts to yield said median diameter of dispersed bitumen particles, with the acid and cationic surfactant being derived from an aqueous solution containing more than 30% by weight of surfactant and sufficient acid to keep the surfactant dissolved in said aqueous solution.

2. A bituminous emulsion according to claim 1, containing at least one nonionic cosurfactant.

3. Coated cold mixes and emulsion-stabilized gravel, characterized in that the emulsion used for the coating is defined in claim 1.

4. Materials obtained by coating or contacting aggregates, recycling materials, mix aggregates (or a blend of these products) with a bituminous emulsion as defined in claim 1.

5. Road pavement obtained by compacting the material according to claim 4.

6. A method of preparing a bituminous emulsion as defined in claim 1, comprising:
 a) providing a concentrated aqueous cationic surfactant solution of said at least one acid and said at least one cationic surfactant comprising more than 30% by weight of surfactant);
 b) progressively adding bitumen having a temperature of between 50 and 120° C. at a controlled rate to the said concentrated cationic surfactant solution maintained with stirring until the bitumen content of the emulsion at the end of this first emulsification phase is equal to 90% by weight or higher; and
 c) lowering the bitumen content of the emulsion down to a value of between 60% and 80% by weight by dilution, while stuffing, with water having a temperature between 20 and 90° C.

7. A bituminous emulsion as prepared by the process of claim 6.

8. Coated cold mixes and emulsion-stabilized gravel, characterized in that the emulsion used for the coating is defined in claim 7.

9. A process according to claim 6, wherein step (a) is conducted by steps comprising forming a solution of less than 30% surfactant and then adding repetitively increments of surfactant and then acid to dissolve non-dissolved surfactant so as to provide said concentration of more than 30% by weight of surfactant.

10. A bituminous emulsion according to claim 1, wherein the median diameter is about 0.4 μm.

11. Materials obtained by coating or contacting aggregates, recycling materials, mix aggregates (or a blend of these products) with a bituminous emulsion as defined in claim 10.

12. Road pavement obtained by compacting the material according to claim 11.

13. Coated cold mixes and emulsion-stabilized gravel, characterized in that the emulsion used for the coating is defined in claim 10.

14. A bituminous emulsion according to claim 1, wherein said cationic surfactant comprises at least one of propoxylated tallow dipropylenetriamine and tallow propylene diamine.

15. A bituminous emulsion according to claim 14, wherein said acid is HCl or $H_3PO_4$.

16. Coated cold mixes and emulsion-stabilized gravel, characterized in that the emulsion used for the coating is defined in claim 15.

17. Materials obtained by coating or contacting aggregates, recycling materials, mix aggregates or a blend of these products with a bituminous emulsion as defined in claim 15.

18. Road pavement obtained by compacting the material according to claim 17.

* * * * *

UNITED STATES PATENT AND TRADEMARK OFFICE
CERTIFICATE OF CORRECTION

PATENT NO. : 7,510,606 B2
APPLICATION NO. : 11/252215
DATED : March 31, 2009
INVENTOR(S) : Bourrel et al.

It is certified that error appears in the above-identified patent and that said Letters Patent is hereby corrected as shown below:

Column 9, line 59, reads "cationic surfactant being present in sufficient amounts to", should read -- cationic surfactant being present in sufficient amounts in the emulsion to --.

Column 10, line 18, reads "between 50 and 120° C. at a controlled rate to said", should read -- between 50 and 120° C., at a controlled rate to the --.

Signed and Sealed this

Nineteenth Day of May, 2009

JOHN DOLL
*Acting Director of the United States Patent and Trademark Office*